Figure 1:
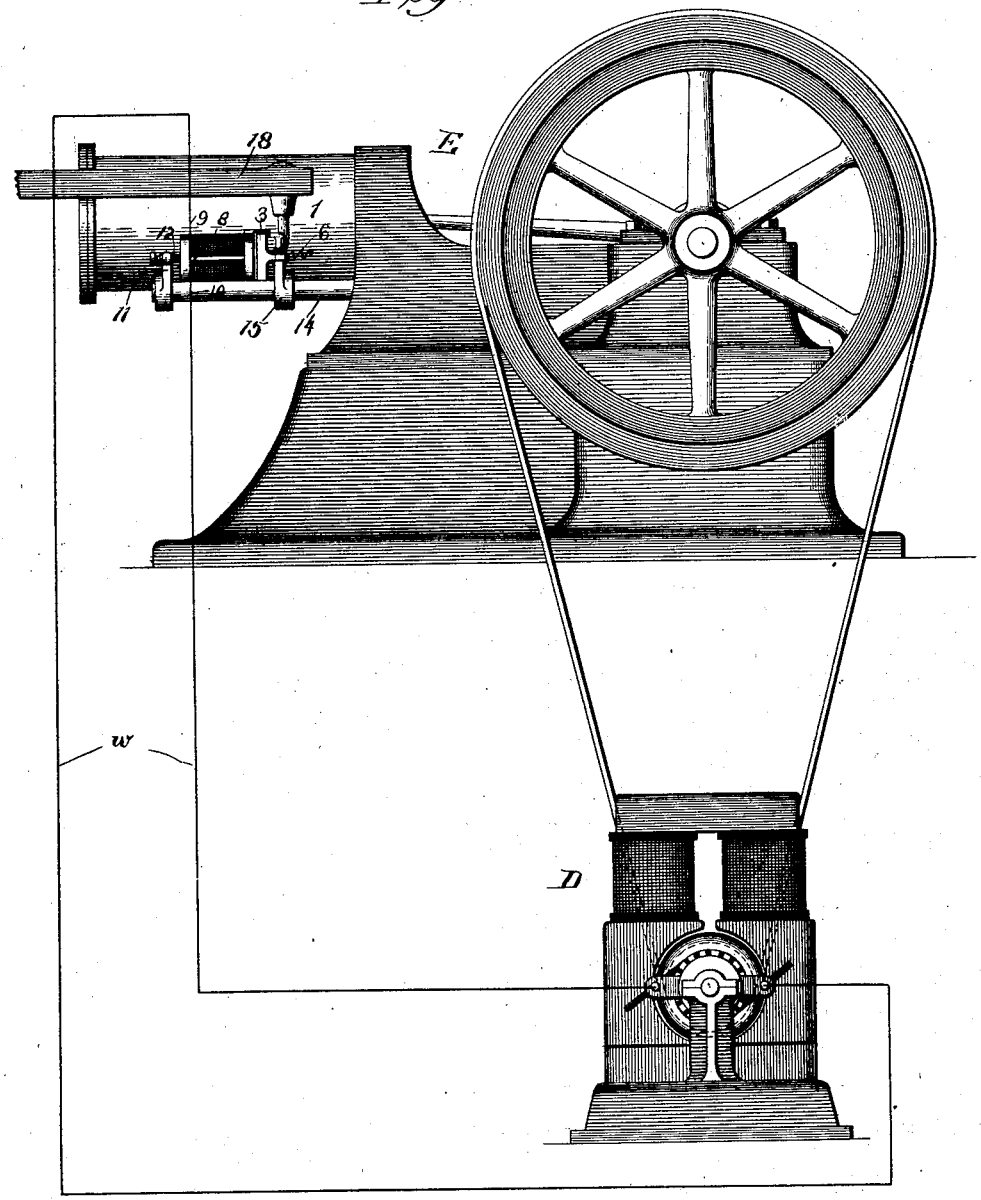

No. 727,564. PATENTED MAY 12, 1903.
V. G. APPLE.
REGULATOR FOR GAS ENGINES.
APPLICATION FILED OCT. 16, 1901.
NO MODEL. 2 SHEETS—SHEET 1.

Witnesses:
John Enders Jr
Geo. S. Mary, Jr.

Inventor:
Vincent G. Apple,
By Foreé Bain
Att'ys

No. 727,564. PATENTED MAY 12, 1903.
V. G. APPLE.
REGULATOR FOR GAS ENGINES.
APPLICATION FILED OCT. 16, 1901.
NO MODEL. 2 SHEETS—SHEET 2.
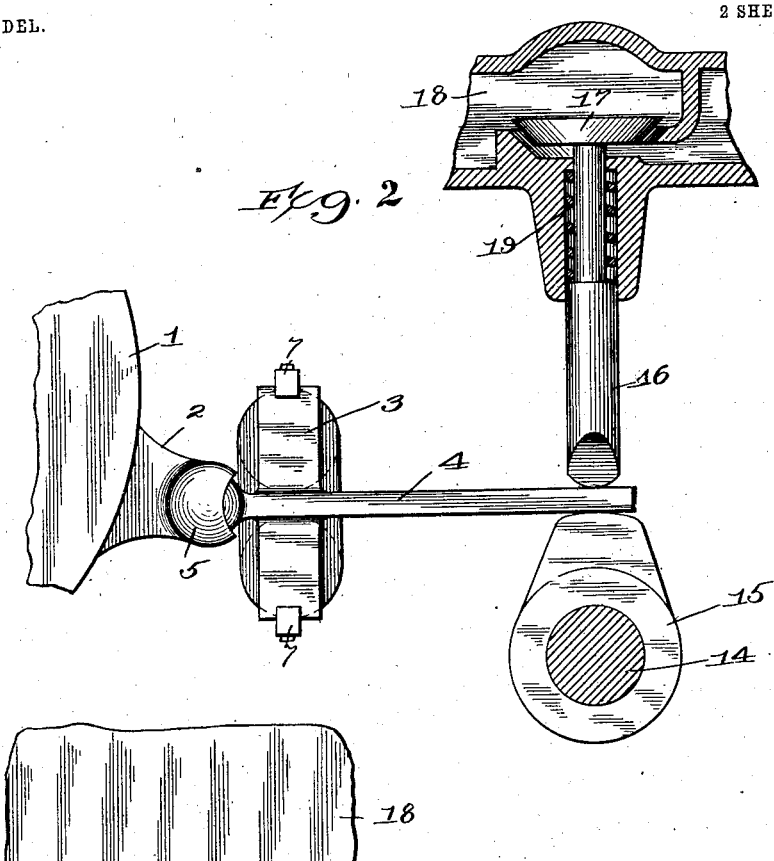
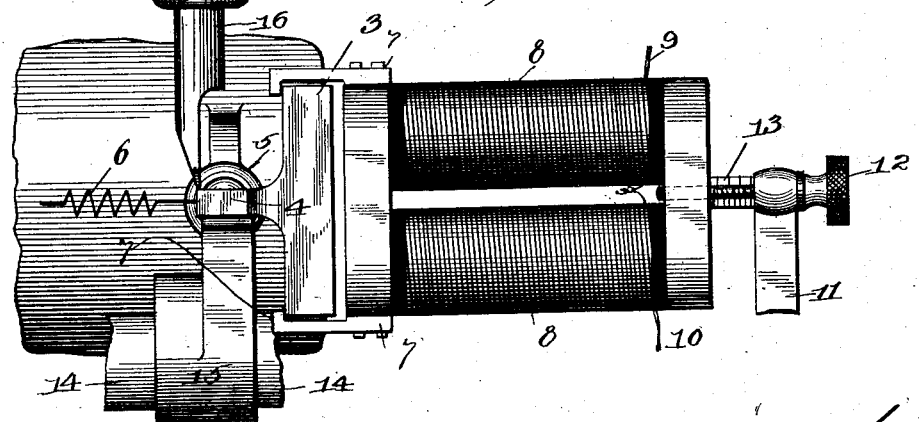

UNITED STATES PATENT OFFICE.

VINCENT G. APPLE, OF DAYTON, OHIO.

REGULATOR FOR GAS-ENGINES.

SPECIFICATION forming part of Letters Patent No. 727,564, dated May 12, 1903.

Application filed October 16, 1901. Serial No. 78,787. (No model.)

*To all whom it may concern:*

Be it known that I, VINCENT G. APPLE, of Dayton, in the county of Montgomery and State of Ohio, have invented certain new and useful Improvements in Regulators for Gas-Engines; and I hereby declare that the following is a full, clear, and exact description thereof, reference being had to the accompanying drawings, which form part of this specification.

My invention relates to improvements in regulators for gas-engines. It has especial reference to a class of regulators or governors for gas-engines in which the regulation is performed by the variation in the intermittent opening of a valve to admit fuel into a cylinder. Controlling the duration of the intermissions between the successive openings of the said valve and the number of impulses produced in a given time constitute the means by which the engine speed is regulated or governed.

The object of my invention is to provide a means controlled by an electric current whereby the number of impulses produced by an engine within a given time, effected by the number of times that a fuel-valve is opened for the purpose of admitting a charge within the cylinder of a gas-engine, may be varied, controlled, and regulated by the strength of an electric current generated by the operation of said engine and flowing through electric coils of an electromagnet adapted to control the means by which the said valve is operated. Heretofore the variation of the velocity of controlling devices rotated by the power-shaft has generally been relied upon as a means for varying the number of explosions within a cylinder of a gas-engine within a given time for the purpose of regulating the power and speed of the said engine. In devices of this character it is necessary for the power-shaft to have changed its velocity before the centrifugal effect of the governing device is changed and the engine speed thereby varied.

My device is especially designed to be used in connection with a gas-engine which is designed to operate an electric dynamo exclusively. The nature of my device is such that the regulating function will have taken place before the velocity of the shaft has been changed, and for this reason a much steadier and more constant speed is secured for the purpose of operating electric lights than is attained by the use of a centrifugal governor.

My invention consists in the features, details of construction, and combination of parts, which will first be described in connection with the accompanying drawings and then particularly pointed out in the claims.

In the drawings, Figure 1 illustrates a conventional gas-engine provided with my regulator and a conventional dynamo driven by such engine, the connection of the dynamo with the regulator being diagrammatically indicated. Fig. 2 is an elevation of my device, showing it attached to an engine and showing the admission-valve, partly in section. Fig. 3 is an end view of the same.

In all of the figures the same letters and numerals of reference indicate similar parts.

E indicates as a whole a gas-engine, and D a dynamo, both shown as of conventional design.

1 indicates the cylinder of the engine E, provided with a bracket 2 for supporting the armature 3. A tongue 4, to which the armature is attached, is pivoted in the ball-and-socket joint 5, formed by the extremities of the tongue and the bracket 2, so that said tongue may be freely moved in any direction. A spring 6 is designed to hold the tongue 4 in a definite position against the stop 7.

8 is an electromagnet provided with terminals 9 and 10 by suitable wiring $w$, connected in circuit with a dynamo that is operated or driven by the gas-engine to be controlled by my governor. Support 11 is the means by which the magnet is held in position upon the adjusting thumb-screw 12.

13 is a gage which shows the position of the electromagnet 8 with reference to its armature 3. A rotary cam-shaft 14 carries the cam 15, which is adapted to displace the tongue 4.

16 is a valve-stem supporting the puppet-valve 17 within the passage-way 18. This passage-way communicates with the fuel-supply and with the interior of the gas-engine. An open helical compression-spring 19 is adapted to hold the valve 17 normally closed upon its seat.

The use and operation of my device are as follows: As heretofore stated, this device is designed to be used in connection with gas-engines governing by the hit-and-miss principle. This governor is intended to be exclusively used for controlling a gas-engine that is driving a dynamo. In this event the electromagnet 8 is connected in circuit with the dynamo either in series in a constant-current circuit, such as produced for the use of arc-lamps, or in a circuit of constant potential, such as used for incandescent lights. In the former case the electromagnet will be connected in series. In the latter it will be connected in parallel exactly in the same manner as the arc and incandescent lamps are respectively connected in circuit. Normally the spring 6 holds the tongue 4 against the stop 7, so that the tongue is flexibly held in the path of the cam 15, and when the cam is revolved the tongue is displaced by the cam, and thereby presses upon the stem 16, which opens the valve 17 and admits a charge of gas into the engine. When the normal speed of the engine has been secured, the electromagnet 8 will be sufficiently powerful to overcome the spring 6 and attract the armature 3, and thereby withdraw the tongue 4 out of the path of the stem 18, so that the cam 15 displaces the tongue. Under these conditions the stem 16 will not be moved, as in the former example, and the charge will not, therefore, be taken into the gas-engine, because the valve will not thereby be opened. Should the voltage decrease in value, then the attractive effect of the electromagnet 8 for its armature 3 will be correspondingly decreased, and the spring 6 will once more pull the tongue 4 into the path of the stem 16, when at the next revolution of the cam 15 the tongue will be displaced thereby, and being in the path of the stem 16 the valve 17 will thereby be again opened and a charge admitted into the cylinder, as will be readily understood by those skilled in the art.

When the engine is driving a dynamo, any variation that may take place in the circuit will affect the current or voltage of the dynamo before the engine is affected by such change. The armature 3 readily and quickly responds to any variation or change that takes place in the circuit of which the electromagnet forms a part, and the regulating action is produced before the velocity of the driving-shaft is altered, and by this means a much more constant speed is maintained than where the regulation is operated by a governor affected by the changes in the speed of the engine.

Having described my invention, what I claim as new and useful, and desire to secure by Letters Patent of the United States, is—

1. The combination with a gas-engine and a dynamo driven thereby, of a fuel-supply valve for the engine provided with a stem, a moving part of said engine adapted to actuate the valve, a movable member normally arranged in alinement with the valve-stem to form a connection between the moving parts and the valve-stem, an armature carried by the movable member, an electromagnet in circuit with the dynamo adapted to move the movable member out of alinement with the valve-stem, a bracket mounted upon the engine to support the movable member, and a ball-and-socket joint between the bracket and the movable member to permit of the movement of said member in two directions, substantially as set forth.

2. The combination with a gas-engine and a dynamo driven thereby of a fuel-supply valve for the engine provided with a projecting stem, a cam adapted to operate said valve, a movable tongue mounted on a stationary part of the engine arranged intermediate the cam and the valve-stem, a spring for normally holding said tongue in alinement with the stem and the cam to form a connection between said parts, and means for moving said tongue out of alinement with the valve-stem comprising an armature secured to the tongue, an electromagnet arranged in circuit with the dynamo and adapted to move the armature, a support for said electromagnet, and means for adjusting said magnet upon its support, substantially as set forth.

In testimony that I claim the foregoing as my own I affix my signature in presence of two witnesses.

VINCENT G. APPLE.

In presence of—
L. M. ARNOLD,
C. R. APPLE.